(12) United States Patent
Weigert

(10) Patent No.: US 7,418,208 B2
(45) Date of Patent: Aug. 26, 2008

(54) OPTOELECTRONIC TRANSCEIVER FOR A BIDIRECTIONAL OPTICAL SIGNAL TRANSMISSION

(75) Inventor: Martin Weigert, Bernhardswald (DE)

(73) Assignee: Finisar Corporation, Sunnyvale, CA (US)

( * ) Notice: Subject to any disclaimer, the term of this patent is extended or adjusted under 35 U.S.C. 154(b) by 546 days.

(21) Appl. No.: 10/769,287

(22) Filed: Jan. 30, 2004

(65) Prior Publication Data

US 2005/0084268 A1    Apr. 21, 2005

(30) Foreign Application Priority Data

Oct. 15, 2003    (DE) ................... 103 48 675

(51) Int. Cl.
*H04B 10/24* (2006.01)
(52) U.S. Cl. ....................... 398/135; 398/42
(58) Field of Classification Search .......... 398/135–139
See application file for complete search history.

(56) References Cited

U.S. PATENT DOCUMENTS

| | | | |
|---|---|---|---|
| 6,215,917 B1 | 4/2001 | Takahashi et al. | |
| 6,301,035 B1 * | 10/2001 | Schairer | ............ 398/128 |
| 6,721,503 B1 * | 4/2004 | Jokerst et al. | ............ 398/41 |
| 2003/0183894 A1 * | 10/2003 | Kohmoto et al. | ............ 257/435 |
| 2003/0223756 A1 * | 12/2003 | Tatum et al. | ............ 398/135 |
| 2005/0019036 A1 * | 1/2005 | Soto et al. | ............ 398/135 |

FOREIGN PATENT DOCUMENTS

| | | |
|---|---|---|
| DE | 4444470 A1 | 5/1996 |
| DE | 10064599 A1 | 7/2002 |
| DE | 101 14 143 A1 | 10/2002 |
| EP | 0 463 214 B1 | 1/1992 |
| GB | 2378068 | 1/2003 |
| WO | WO 98/10319 | 3/1998 |
| WO | WO 02/084358 | 10/2002 |
| WO | WO 02/095470 | 11/2002 |

* cited by examiner

*Primary Examiner*—Leslie Pascal
(74) *Attorney, Agent, or Firm*—Workman Nydegger

(57) ABSTRACT

An optoelectronic transceiver for a bidirectional optical signal transmission including a housing having a width of at most 13.5 mm, a first bidirectional optical subassembly arranged in the housing and serving for the simultaneous emission and reception of optical signals, a second bidirectional optical subassembly arranged in the housing and serving for the simultaneous emission and reception of optical signals, and an optical interface for the coupling of two optical waveguides, it being possible for a respective optical waveguide to be optically coupled to a subassembly. The invention enables a simultaneous bidirectional data transmission on both ports of the transceiver and thus an increase in the transmission capacity of the transceiver.

37 Claims, 6 Drawing Sheets

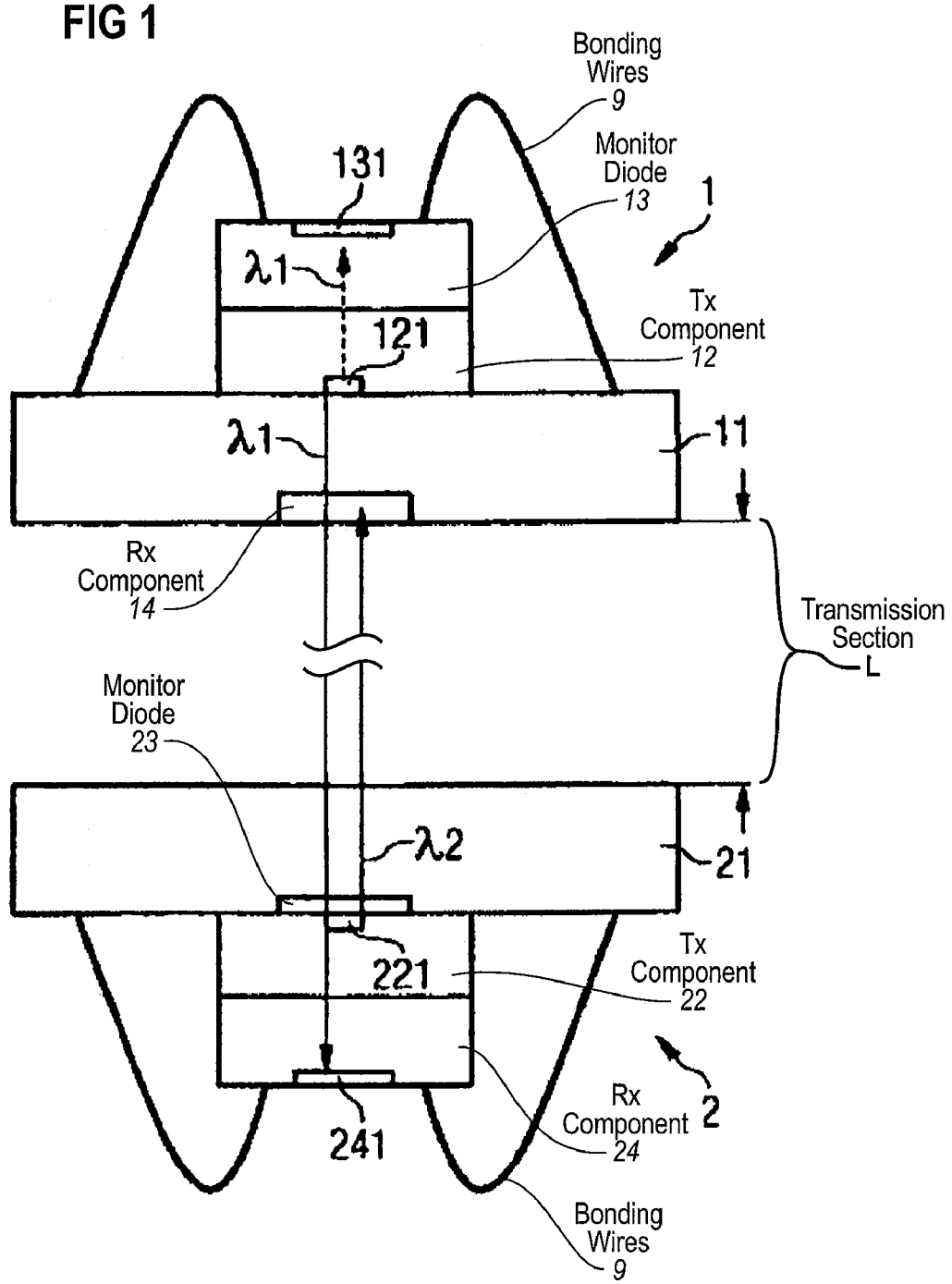

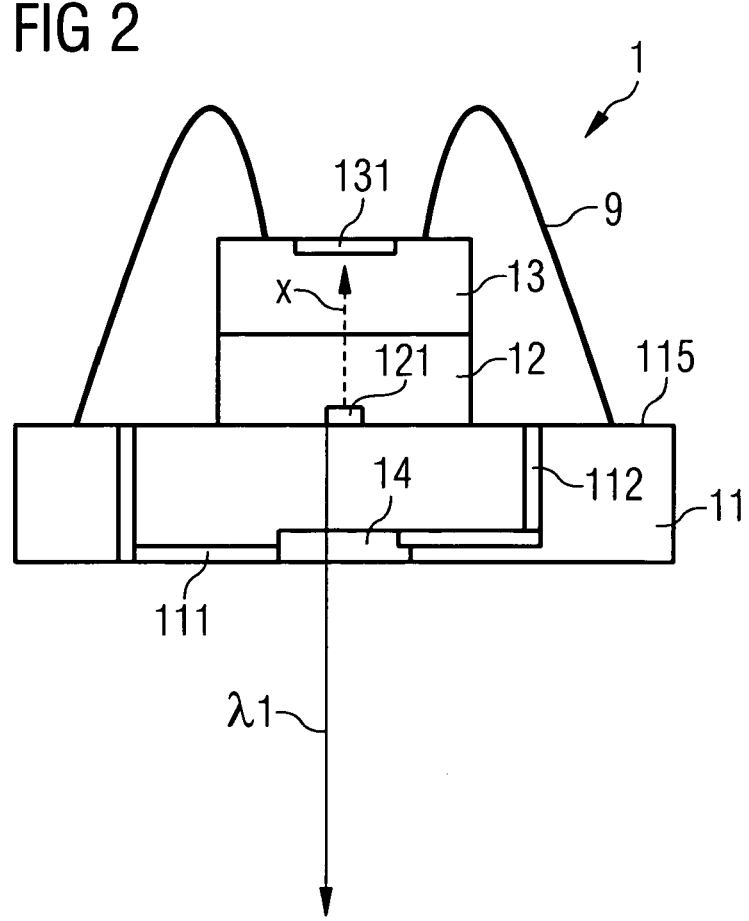
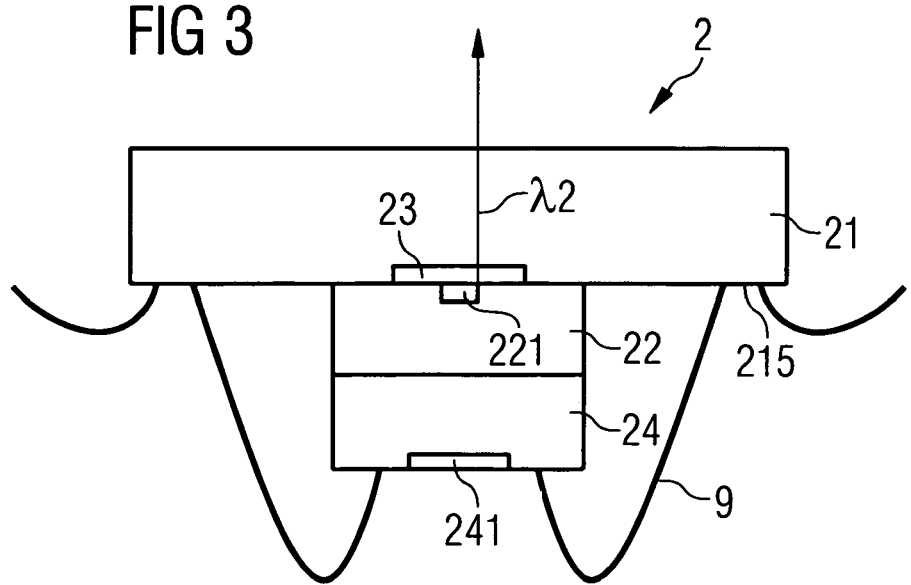

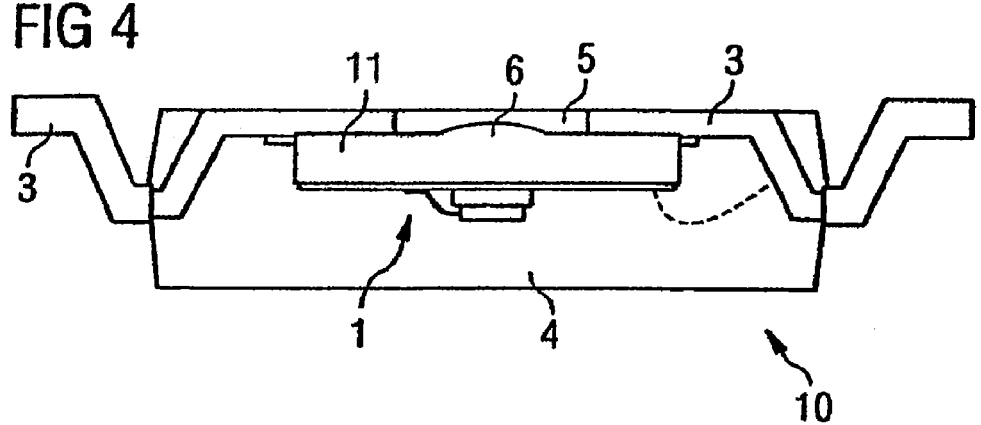
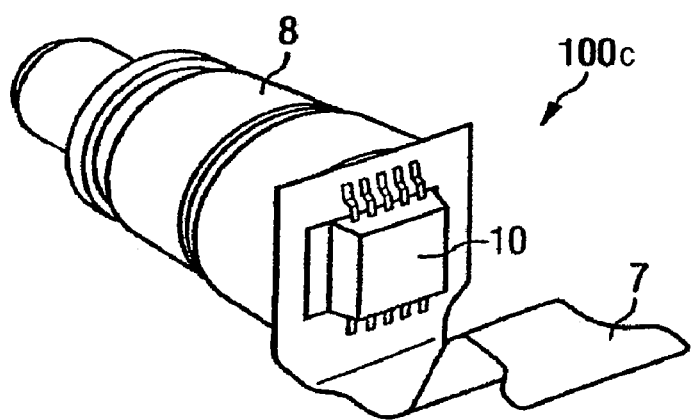

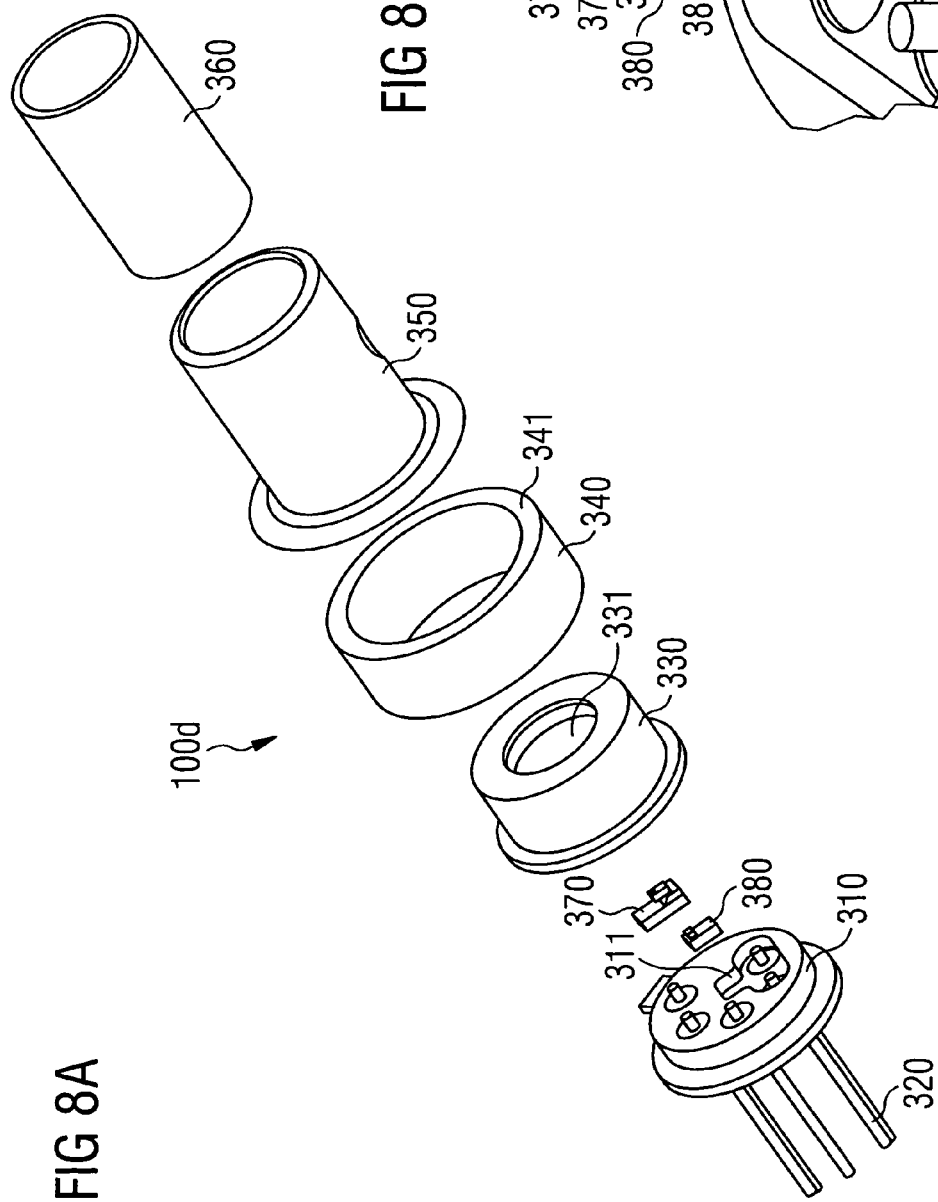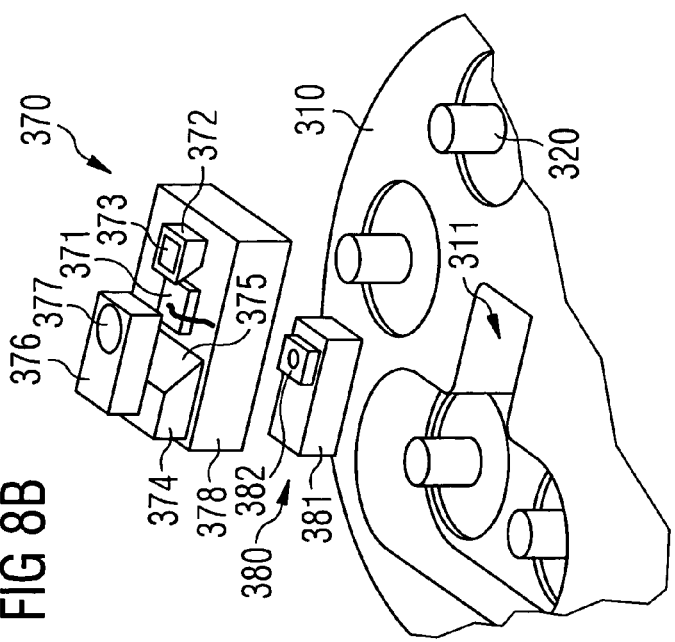

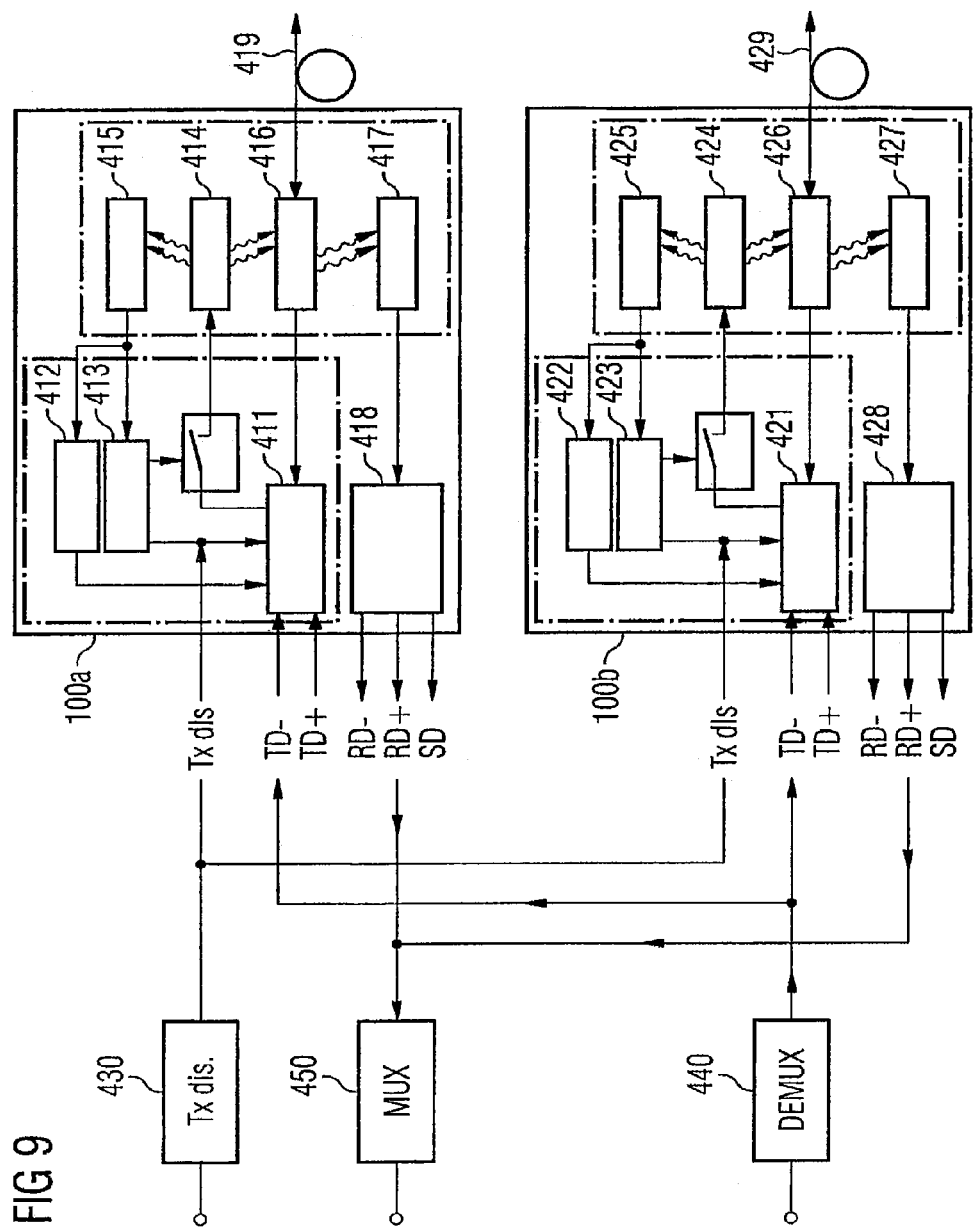

OPTOELECTRONIC TRANSCEIVER FOR A BIDIRECTIONAL OPTICAL SIGNAL TRANSMISSION

FIELD OF THE INVENTION

The invention relates to an optoelectronic transceiver for a bidirectional optical signal transmission.

BACKGROUND OF THE INVENTION

What are known as industry standard are so-called small form factor (SFF) transceivers and small form factor pluggable (SFP) transceivers of small design which are arranged in a housing. In this case, the transceivers may be of pluggable design (SFP transceivers) or be fixedly connected to a housing (SFF transceivers). The known transceivers have, in addition to an optoelectronic transmission module and an optoelectronic reception module, an internal printed circuit board which runs parallel to the optical axis of the transceiver and contains electronic circuits for the converter modules, such as a driver module and/or a preamplifier module. The transceiver is arranged on a main circuit board, which is electrically connected to an electrical interface of the internal printed circuit board via a plug, for example. An SFP transceiver is described in DE 101 14 143 A1 for example.

EP-A-0 463 214 describes a transmission and reception module for a bidirectional optical signal transmission, which is known as BIDI module. In the case of this module the two active components, namely light transmitter and light receiver, are incorporated as independent components in a manner hermetically tightly encapsulated in a common module housing, in the interior of which a beam splitter and a lens coupling optical system are arranged. The module housing has a fiber connection for a common optical fiber. One optical signal is coupled into the coupled optical fiber by the transmitter, while at the same time another optical signal can be received from the same fiber. The two signals are separated by a beam splitter, which may also contain a wavelength-selective filter which reflects a specific wavelength and allows another wavelength to pass.

WO 02/095470 A1 discloses an electro-optical module for the transmission and/or reception of optical signals of at least two optical data channels, in which at least two optical waveguide sections having in each case at least one beveled end face are provided. The optical waveguide sections are positioned axially one behind the other at the beveled end faces. For a specific optical channel, light is coupled in and light is coupled out at the beveled end face of an optical waveguide section at an angle to the optical axis of the optical waveguide. In this case, the end face is coated with a wavelength-selective filter for wavelength separation purposes.

WO 02/084 358 discloses a transmission module for an optical signal transmission, in which a transmission device is arranged on a transmission device substrate and a detection device is arranged on a detection device substrate and the transmission device substrate and the detection device substrate are arranged one above the other with respect to the direction of the emitted or received light. In this case, the transmission device substrate and/or the detection device substrate are transparent to the wavelength emitted by the transmission device. The known transmission module provides an advantageous construction although with only one detection device.

It is endeavored to provide transceivers of small design for a bidirectional optical data transmission which can realize a high data rate and at the same time can be produced cost-effectively.

SUMMARY OF THE INVENTION

The solution according to the invention is distinguished by the concept of arranging two bidirectional optical subassemblies in a housing of small design having a width of at most 13.5 nm, both of which subassemblies are suitable for the simultaneous emission and reception of optical signals. Each subassembly can in each case be optically coupled to an optical waveguide via an optical interface for the coupling of two optical waveguides.

Each optical subassembly contains both an optical transmitter and an optical receiver. It is also referred to as BOSA (bidirectional optical subassembly). Consequently, unlike in known transceivers, in the case of the present invention each subassembly is designed as a bidirectional transmission and reception module. Optical signals can thus be transmitted in both directions simultaneously in an optical link between two transceivers on an optical waveguide, each transmission direction operating with a different wavelength. This makes it possible to increase the transmission capacity of an optical link and thus the capacity of existing fiber-optic networks. At the same time, optical subassemblies of small design are used so that they can be integrated into a housing of small design, in particular in accordance with the SSF or SSP industry standard.

In a preferred refinement of the invention, the transceiver additionally has a multiplexer and a demultiplexer. These are preferably concomitantly integrated into the transceiver housing, but may, in principle, also be arranged separately. The demultiplexer divides an electrical data stream having a predetermined bandwidth, which is to be transmitted by the transceiver, into a first and a second partial data stream to be transmitted, in each case having a smaller bandwidth. The first partial datastream to be transmitted is fed to the first subassembly and the second partial datastream to be transmitted is fed to the second subassembly. The first and second partial datastreams to be transmitted are then emitted as optical signals via the first and second subassemblies. At the same time as the emission of optical signals, the first subassembly and the second subassembly receive a first optical partial datastream to be received and a second optical partial datastream to be received, in each case having a specific bandwidth, convert them into electrical signals and feed the electrical signals to the multiplexer, which combines the two received partial datastreams into a received electrical datastream having a predetermined, higher bandwidth. In this case, preferably, the demultiplexer is a 1:2 demultiplexer and the multiplexer is a 2:1 multiplexer, the predetermined bandwidths of the data signal to be transmitted and of the received data signal being identical.

The use of a multiplexer and of a demultiplexer in the manner described makes it possible for the transmission capacity of the transceiver to be doubled overall for the same data rate of the individual subassemblies. In this case, the two subassemblies are simultaneously operated bidirectionally. Consequently, on one fiber it is possible to transport precisely as much data as on two fibers in previous transceivers. The capacity of existing fiber networks can accordingly be doubled. In this case, it is advantageous that the increase in the transmission capacity does not necessitate changing the external circuitry and the electrical interface of the transceiver. These can be maintained. Moreover, in the subassemblies it is possible to have recourse to in each case cost-effectively available components such as vertically emitting laser diodes (VCSEL), edge emitting lasers and pin diodes.

In a preferred embodiment of the invention, the first subassembly has the following components: a transmission component, which emits light having a first wavelength, a reception component, which detects light having a second wavelength, a carrier substrate, which is transparent to the light having the first wavelength and on which the transmission component is arranged. A monitor component which detects a fraction of the light emitted by the transmission component, the reception component being integrated into the carrier substrate, the reception component and the transmission component being arranged one behind the other with respect to the direction of the emitted or received light, the reception component being optically transparent to the light having the first wavelength, and light emitted by the transmission component radiating through the carrier substrate and the reception component.

In a preferred embodiment of the invention, the second subassembly has the following components: a transmission component, which emits light having a second wavelength, a reception component, which detects light having a first wavelength, a carrier substrate, which is transparent to the light having the first wavelength and having the second wavelength and on which the transmission component is arranged, and a monitor component, which detects a fraction of the light emitted by the transmission component, the reception component and the transmission component being arranged one behind the other with respect to the direction of the emitted or received light, the transmission component being optically transparent to the light having the first wavelength, light emitted by the transmission component radiating through the carrier substrate and the light received by the reception component radiating through the carrier substrate and the transmission components.

The two subassemblies are suitable for simultaneously transmitting data in both directions among one another via an optical link, the light emitted by one subassembly in each case being received by the other subassembly.

In this case, for both subassemblies, use is made of an arrangement in which the transmission component and reception component are arranged one behind the other with respect to the direction of the emitted or received light, with the result that beam deflection is not necessary. This considerably simplifies the construction. Furthermore, a filter for wavelength separation is not absolutely necessary. In this case, use is made of the fact that the materials used for the carrier substrate, the transmission component and the reception component are transparent to specific wavelengths, but in contrast are not transparent to other wavelengths. In particular, this refinement exploits the effect that longer-wave light for example having a wavelength of 1310 nm can radiate through substrates which generate shorter-wave light of 850 nm, for example.

A compact construction of a bidirectional subassembly with a reduced number of parts and thus low production costs is made available in each case, the subassembly simultaneously permitting monitoring of the light of the transmission component. The bidirectional subassembly constructed in this way can furthermore be embodied in a small structural configuration and can be integrated into a transceiver housing of small design.

The wavelengths of the transmission component and of the reception component are preferably chosen such that they correspond to the customary wavelengths in optical transmission technology, thus in particular to the optical "windows" of customary optical fibers. Wavelength combinations of 850 nm/1310 nm, 850 nm/1490 nm or 850 nm/1550 nm are preferable chosen for the first and second wavelengths. A combination for the first and second wavelengths of 1310 nm/1550 nm is likewise possible.

However, the transceiver according to the invention can also be embodied in combination with optical subassemblies that are embodied differently. In another exemplary embodiment, a subassembly has: a transmission micromodule, which has a laser component on a first carrier element, said laser component emitting light having a first wavelength, a reception micromodule, which has a photodiode on a second carrier element, said photodiode detecting light having a second wavelength, and a TO housing having a baseplate, which serves for the arrangement of the transmission micromodule and of the reception micromodule, the transmission micromodule and the reception micromodule being arranged one above the other with respect to the emitted light or light to be detected, and the first carrier element of the transmission micromodule being transparent to the light to be detected. In a preferred embodiment variant, the baseplate of the TO housing in this case has a cutout, which serves to accommodate the reception micromodule, the transmission micromodule being arranged thereabove on the baseplate.

The other subassembly of the transceiver is designed identically except for the fact that the respective other wavelength is emitted and detected.

This embodiment of the subassemblies has recourse to cost-effective constructional forms using a TO housing. Edge emitting laser diodes may be used in this case. The subassembly is once again embodied in a small structural configuration and can be integrated into a transceiver housing of small design.

BRIEF DESCRIPTION OF THE DRAWINGS

The invention is explained in more detail below using a plurality of exemplary embodiments with reference to the figures, in which:

FIG. 1 shows a diagrammatic illustration of the construction of two mutually complementary optical subassemblies for the bidirectional data transmission.

FIG. 2 shows the construction of a first subassembly for a bidirectional data transmission, which emits light having a first wavelength and receives light having a second wavelength.

FIG. 3 shows the construction of a second subassembly for a bidirectional data transmission, which emits light having the second wavelength and receives light having the first wavelength.

FIG. 4 shows a section through a housing with a subassembly in accordance with FIG. 2 or 3.

FIG. 5 shows a perspective view of the subassembly of FIG. 4, which is connected to a plug receptacle and is contact-connected via a flexible foil.

FIG. 8A shows an exploded illustration of the construction of a further exemplary embodiment of a subassembly for a transceiver in accordance with FIG. 6.

FIG. 8B shows a detail view of the subassembly of FIG. 8A, which illustrates the arrangement of a micro-transmission module and of a micro-reception module on the baseplate of a TO housing.

FIG. 9 shows a block diagram of the functional components of the transceiver of FIG. 6.

DESCRIPTION OF A PLURALITY OF PREFERRED EXEMPLARY EMBODIMENTS

Figure 6:
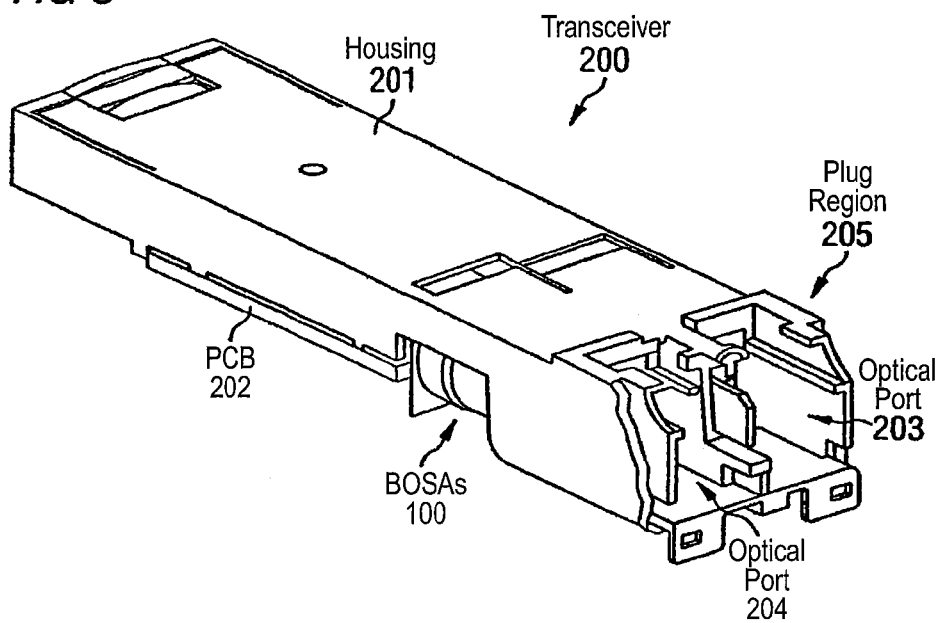
FIG. 6 shows a perspective illustration of an optoelectronic transceiver with a housing and two subassemblies in accordance with FIG. 5 or in accordance with FIG. 8A.

FIG. 6 shows an optoelectronic transceiver 200 of small design in accordance with the SFP industry standard. The transceiver 200 has an elongate housing 201 having a width of less than 13.5 mm. The transceiver 200 contains two bidirectional optical subassemblies (BOSAs) 100 arranged next to one another in the housing 201, one of said subassemblies being illustrated. An optical interface is provided by a plug region 205 with two optical ports 203, 204. An optical waveguide can be plugged into each optical port 203, 204, an optical coupling between the optical waveguide and the respective subassembly 100 being effected, so that each subassembly 100 can emit and receive optical signals via a connected optical waveguide.

The two subassemblies 100 are electrically connected to an internal printed circuit board 202 of the transceiver 200 via a flexible conductor, said printed-circuit board having electrical components such as a driver module, for instance, in a customary manner. The printed circuit board 202 can be connected to a main circuit board via an electrical interface (not illustrated). In this case it is conceivable that the internal printed circuit board 202 of the transceiver is dispensed with and the corresponding electrical components are additionally integrated into the subassemblies 100.

It is pointed out that both subassemblies 100 are designed as bidirectional modules, that is to say the transceiver 200 can simultaneously emit light having one wavelength and receive light having another wavelength at each port. The subassemblies 100 are embodied in a small structural configuration, so that they fit next to one another into the available housing width of 13.5 m, it generally being necessary, in addition, to comply with a minimum distance between the subassemblies 100. Exemplary embodiments of the configuration of the subassemblies 100 in a small structural configuration are described below in FIGS. 1 to 5, on the one hand, and in FIGS. 8A, 8B, on the other hand.

Before these configurations of the subassemblies 100 are explained, however, firstly the functional components of the transceiver 200 will be considered in greater detail with reference to FIG. 9.

Two bidirectional optical subassemblies 100a, 100b are present, which are identical apart from the fact that the emitted and received wavelength are interchanged. Each subassembly 100a, 100b has a laser driver 411, 421, a power monitoring device 412, 422 with an assigned automatic shutdown unit 413, 423, a laser diode 414, 424, a monitor diode 415, 425, a beam splitter 416, 426, a photodetector 417, 427 and a reception circuit 418, 428. Coupled to the beam splitter 416, 426 is an optical waveguide 419, 429, which is preferably a single-mode optical fiber.

The method of operation is known per se. The laser diode 414, 424 is driven by the laser driver 411, 421, to which a digital signal to be transmitted is applied at its inputs TD−, TD+. A part of the radiation emitted by the laser diode 414, 424 is detected by the monitor diode 415, 425 and fed to the power monitoring device 412, 422, which outputs a control signal to the laser driver 411, 421 in accordance with the laser power determined. In the event of predetermined criteria being violated or given the presence of a corresponding external control signal Tx dis (Transmit disable), the laser 414, 424 is automatically shut down by the shutdown unit 413, 423.

The light emitted by the laser 414, 424 is coupled into the optical fiber 419, 429 via the beam splitter 416, 426. Light is transmitted bidirectionally on the optical fiber 419, 429. Light having a wavelength to be detected, which differs from the wavelength of the emitted light of the laser 414, 424, is received via the optical fiber 419, 429 and fed from the beam splitter 416, 426 to the photodetector 417, 427. The detected signal is conditioned in the reception circuit 418, 428 and output as a regenerated electrical signal at outputs RD−, RD+. The output "SD" (Signal Detect) indicates whether a received signal is present.

An external control signal Tx dis (Transmit disable) can be fed simultaneously to both subassemblies 100a, 100b via a unit 430, so that both lasers are shut down simultaneously, as necessary.

The arrangement of FIG. 9 is distinguished by the fact that, in a bidirectional transceiver, the two subassemblies 100a, 100b are embodied as bidirectional units both with a laser 414, 424 and with a detector 417, 427. The transceiver with the subassemblies 100a, 100b can communicate with a structurally identical transceiver (at the other end of the optical fibers 419, 429). For this purpose, it is provided, for example, that the laser 414 of the subassembly 100a emits light having a wavelength of 1300 nm, while the photodiode 417 receives light having a wavelength of 850 nm. By contrast, the subassembly 100b emits light having a wavelength of 850 nm and receives light having a wavelength of 1300 nm. The respective subassembly 100a, 100b can accordingly communicate with the subassembly 100b, 100a opposite to it in a transceiver of structurally identical design.

In this case, the wavelength combinations can be chosen virtually as desired. Wavelength combinations of 850 nm/1310 nm, 850 nm/1490 nm, 850 nm/1550 nm or else 1310/1550 nm are preferably chosen. The fact of whether a signal transmission between two transceivers is effected via single-mode or multi-mode fibers depends, inter alia, on the wavelength combination chosen.

The arrangement of FIG. 9 is furthermore distinguished by an additional demultiplexer 440 and multiplexer 450. The demultiplexer 440 is a 1:2 demultiplexer and the multiplexer 450 is a 2:1 multiplexer. Their use enables the transmission capacity per fiber pair 419, 429 to be doubled with the external circuitry of the transceiver being unchanged (i.e. with the electrical interface of the transceiver being maintained). In this case, as explained, two structurally identical transceivers are used for a link, the fibers of which transceivers must not cross one another. The data having a predetermined bandwidth that are to be transmitted are divided into two partial datastreams by the demultiplexer 440, said partial datastreams in each case having half the bandwidth of the bandwidth to be transmitted.

The data of the two partial datastreams are in each case transmitted via a subassembly 100a, 100b and the associated optical fiber 419, 429 to a structurally identical transceiver. At the same time, partial datastreams transmitted by such a structurally identical transceiver are received by the subassemblies 100a, 100b and fed to the multiplexer 450. In the multiplexer 450, the partial data streams are combined into a received electrical datastream having the doubled, original bandwidth. In this way, it is possible to realize a data transmission bandwidth which is twice as large as the bandwidth of an individual laser component or reception component.

In order to increase the bandwidth of the data which can be transmitted between two transceivers 200, it is thus provided that the datastream to be transmitted is divided, by means of the demultiplexer 440, into two partial datastreams each having a bandwidth of 50% of the datastream to be transmitted.

The two partial datastreams are conducted to the two optoelectronic subassemblies 100a, 100b arranged in the transceiver 200 and converted into optical signals. The datastream is thus divided between two transmission components and—in each case with half the bandwidth—transmitted simultaneously via two connected optical fibers to a correspondingly constructed transceiver. At the other transceiver, the two datastreams are recombined by means of a multiplexer, so that overall a data transmission with a doubled bandwidth is possible in comparison with the bandwidth respectively provided by a transmitter and a receiver. By virtue of the two fibers being utilized to capacity bidirectionally and by virtue of the datastream being multiplexed and demultiplexed, it is possible to double the capacity of existing fiber networks.

The construction of the subassemblies of the transceiver will now be discussed.

FIG. 1 shows an arrangement having two modules 1, 2 for a bidirectional data transmission. The modules are designed complementarily with respect to one another insofar as the light having a first wavelength emitted by the first module 1 is detected by the second module 2 and the light having a second wavelength emitted by the second module 2 is detected by the first module 1. Situated between the modules 1, 2 is a signal transmission section L, in which the signals are generally transmitted via optical fibers or other optical waveguides. A transmission via a multimode waveguide is preferably effected. The direct confrontation of the modules 1, 2 in FIG. 1 is thus to be understood to be only diagrammatic.

The first module 1 has a carrier substrate 11, a transmission device 12, a monitor diode 13 and a reception device 14. The transmission device 12 is preferably a VCSEL laser diode with a VCSEL structure 121 formed in a prefabricated chip. The laser diode 12 is mounted upside down, that is to say with the light-emitting side downward on the carrier substrate 11, so that the light-emitting region 121 directly adjoins the carrier substrate 11.

Arranged on the rear side of the laser diode 12 is a monitor diode 13 with a light-sensitive pn junction 131, said monitor diode being contact-connected via bonding wires 9. The monitor diode 13 detects a fraction of the light emitted by the laser diode 12. It is connected to a control/regulating device (not illustrated) for regulating the output power of the laser diode 1.

The monitor diode 13 is likewise preferably formed as a prefabricated chip, preferably in an InP substrate. As an alternative, however, the monitor diode may also be monolithically integrated into the laser diode 12. For this case, on the side remote from the carrier substrate 11, a pn junction is integrated into the laser diode 12 and contact-connected via bonding wires 9, for instance.

The laser diode 12 emits light having a first wavelength $\lambda 1$, where $\lambda 1$ is preferably 1310 nm, or alternatively about 1490 nm or about 1550 nm. A fraction of the light is coupled out from the resonator of the laser diode 12 in the direction of the monitor diode 13 and detected by the monitor diode 13 for monitor purposes. The substrate of the laser diode 12 is in this case transparent to the emitted light having the wavelength $\lambda 1$, as is the substrate of the monitor diode 13. In this case, the substrate of the laser diode 12 is composed for example of GaAs, which is light-transmissive to light having wavelengths above 950 nm.

The carrier substrate 11 is preferably composed of silicon. Silicon is transparent to wavelengths above about 1100 nm. However, it is also possible to use a different material as carrier substrate which is transparent to the emitted wavelength $\lambda 1$.

The reception component 14 is integrated into the carrier substrate 11. For this purpose, the carrier substrate forms a pn junction at the side remote from the transmission component 12. The use of silicon as carrier substrate 11 and as material of the reception component 14 is particularly cost-effective.

The reception component 14 detects light having a second wavelength $\lambda 2$, which is less than the first wavelength $\lambda 1$. The carrier substrate 11 is not transparent to the second wavelength $\lambda 2$, so that an optical isolation is present between the transmission component 12 and the reception component 14 with regard to the received light having the wavelength $\lambda 2$. By contrast, the light having the wavelength $\lambda 1$ emitted by the laser diode 12 radiates through the carrier substrate 11 and also the reception node 14 in an undisturbed manner.

If the wavelengths 1550 nm and 1310 nm are chosen for $\lambda 1$ and $\lambda 2$, the carrier substrate must be composed of a different material than silicon, since silicon is transparent to these wavelengths and, consequently, an optical isolation is no longer present between the transmission component 12 and the reception component 14 with regard to the received light having the wavelength $\lambda 2$. By way of example, the carrier substrate 11 for this case is composed of InP or sapphire with germanium layers.

The complementary module 2 likewise has a carrier substrate 21, a transmission component 22, a reception component 24 and a monitor diode 23.

The transmission device is preferably once again a VCSEL laser diode 22 with a light-emitting region 221, which emits light having the second wavelength $\lambda 2$. The laser diode 22 is fitted upside down as chip 22 on the substrate 21. The substrate of the laser diode 22 is preferably composed of GaAs, which is light-transmissive to light having wavelengths above 950 nm.

In this configuration, the reception component 24, which is preferably formed as a prefabricated photodiode chip (for instance made of InP) with an integrated pn junction 241, is arranged on that side of the laser diode 22 which is remote from the carrier substrate 21. The reception diode 24 is contact-connected via bonding wires 9. The reception diode detects light having the wavelengths $\lambda 1$. In this respect, the module 2 is complementary to the other module 1.

The monitor diode 23 is integrated into the carrier substrate 21 in the case of the module 2. In accordance with FIG. 1, the monitor diode 23 is in this case preferably situated on that side of the carrier substrate 21 which faces the laser diode 22.

The carrier substrate 21 is transparent to the light having the wavelength $\lambda 2$ emitted by the laser diode 22, as well as to the light having the wavelength $\lambda 1$ emitted by the laser diode 12 of the complementary module 1. The substrate of the laser diode 22 itself, by contrast, is only transparent to the light having the wavelength $\lambda 1$ detected by the reception diode 24, and not, by contrast, to the emitted light. Light emitted from the resonator of the laser diode 22 in the direction of the reception diode 24 is therefore absorbed and does not disturb the reception diode 24. The substrate of the laser diode 22 accordingly acts as a blocking filter. It is optionally possible for a blocking filter additionally to be arranged on that side of the laser diode 22 which faces the reception diode 24. Additional blocking filters may also be provided at the module 1.

The light having the wavelength $\lambda 2$ emitted by the laser diode 22 firstly radiates through the monitor diode 23. In this case, a small fraction of the emitted light is detected for monitor purposes. The non-detected proportion radiates through the carrier substrate 21 and is coupled out from the module 2.

FIG. 2 shows the construction of the module 1 of FIG. 1 in somewhat greater detail.

The VCSEL laser diode 12 is arranged by flip-chip mounting on the one top side 115 of the silicon carrier substrate 11, which is optically transparent only to light having the emitted wavelengths λ1. In this case, the p-type contact and the n-type contact of the laser diode are arranged on the mounting side, i.e. the side facing the carrier substrate 201. The contact-connection is effected via corresponding metalizations on the top side 115 of the carrier substrate 11 (not illustrated).

The monitor diode 13 is mounted on the laser diode 12 on the rear side and detects a fraction X of the light of the laser diode 12. The monitor diode 13 is electrically connected via two bonding wires 9 connected to corresponding bonding pads on the top side of the carrier substrate (not illustrated).

Situated in the silicon carrier substrate 11 are two plated-through holes 111, 112, which contact-connect the reception diode 14 integrated into the carrier substrate 11. Thus, all the electrical contacts are situated on a plane, the mounting plane, formed by the one top side 115 of the carrier substrate 11. In this way, from the mounting plane 115, it is then possible to effect bonding onto a lead frame in a simple manner, as is also illustrated in FIG. 4.

The second module 2 of FIG. 1 is illustrated in detail in FIG. 3. The carrier substrate 21 is transparent both to light having the detected wavelength λ1 and to light having the emitted wavelength λ2. It is preferably composed of sapphire. Sapphire is transparent to wavelengths between 850 nm and 1550 nm.

The VCSEL laser diode 22 is once again mounted on the one side 215 of the carrier substrate 21 by means of flip-chip mounting, so that both contacts are on the same side. In this respect, the construction is comparable to that of the laser diode 12 of FIG. 2.

The reception diode 24 with the pn junction 241, which diode is not sensitive to wavelength λ2, is mounted on the VCSEL laser diode 22 on the rear side. A reception diode comprising an InP substrate is preferably involved. It serves to detect the light having the wavelength λ1 emitted by the module 1, which light has been emitted by the complementary module 1.

The monitor diode 23 is integrated into the sapphire. For this purpose, a crystalline silicon layer is preferably integrated into the sapphire, which layer provides a pn junction. The monitor diode 23 is preferably formed on that side of the carrier substrate 21 which faces the laser diode 22. This enables simple contact connection of the monitor diode via contacts on the surface 215 of the carrier substrate.

Figure 7:
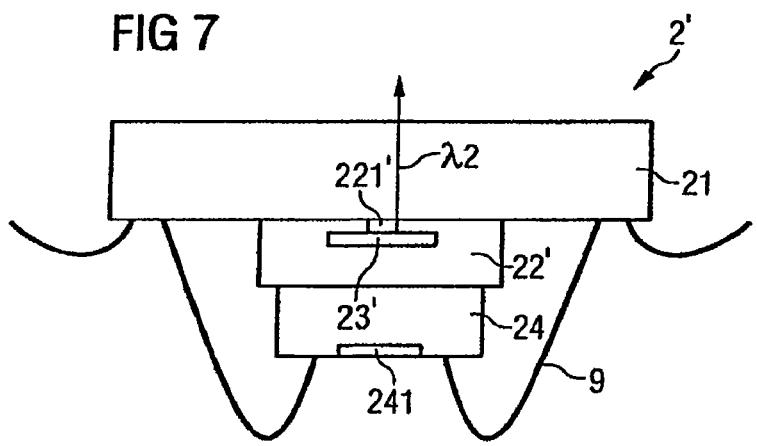
FIG. 7 shows an alternative configuration of the subassembly of FIG. 3.

FIG. 7 shows an alternative configuration of the module to FIG. 3. In the case of this configuration, the monitor diode 23' is not integrated into the carrier substrate 21, but is instead integrated into the laser diode 22' itself. For this purpose, a pn junction is integrated between the VCSEL structure 221' and the substrate (preferably composed of GaAs) of the laser diode. In this exemplary embodiment, the laser diode 22' is made somewhat larger than the reception diode 24, so that there is the possibility of contact connection of a common contact of the laser diode 22' and of the integrated monitor diode 23' via a bonding wire 9 which is contact-connected to the carrier substrate 21 or, as an alternative, directly to a lead frame.

In this configuration, too, the substrate of the laser diode 22' acts as a blocking filter for light emitted in the direction of the reception diode 24 after said light has passed through the monitor diode 23'.

FIG. 4 shows the bidirectional module 1 of FIG. 2 as a housed module 10 in a standard housing. In this case, the carrier substrate 11 may have a lens 6, which is situated on the optical axis and sheds the emitted or received light for the purpose of better coupling to an optical waveguide. The carrier substrate 11 is arranged on a lead frame 3, which has a central cutout 5 for an optical access to the module and provides the contact connection of the module 1. Except for the optical access 5, the arrangement of module 1 and lead frame 3 is encapsulated by injection-molding with a non-transparent plastics composition. Such housings are known per se, for instance from DE 102 01 102 A1, so that they are not discussed in any greater detail. In addition, although FIG. 4 shows bidirectional module 1 and its carrier substrate 11 in housed module 10, a similar housed module may house bidirectional module 2 of FIG. 3 (or bidirectional 2' of FIG. 7) and its carrier substrate 21.

FIG. 5 shows a subassembly 100c with the housed module 10 of FIG. 4 in connection with an optical plug receptacle 8 for receiving an optical waveguide. At the same time, provision is made of a flexible conductor 7 with conductor tracks and contact pads for the contact connection of the connecting contacts of the module 10. That end of the flexible conductor 7 which is not connected to the module 10 is connected to a printed circuit board (not illustrated).

FIGS. 8A and 8B show an alternative configuration of a subassembly 100d, which can be used in an optoelectronic transceiver 200 in accordance with FIG. 6. In this case, once again two subassemblies 100d are arranged in an arrangement next to one another in the transceiver 200, in each case in an orientation such that the optical access of the subassembly 100d in each case runs parallel to the longitudinal axis of the transceiver 200, so that an optical coupling to an optical fiber in each case can be effected via the optical ports 203, 204.

The subassembly 100d has a TO housing comprising, in a manner known per se, a baseplate 310 with plated-through holes for a plurality of contact pins 320 and a cap 330 with an optical window 331, which cap is fixed in hermetically sealed fashion on the baseplate 310. The cap 330 is surrounded by a wall sleeve 340, at whose end side 341 is fitted a covering cap 350 with a coupling device 360 for receiving an optical waveguide to be connected, which is preferably a single-mode optical waveguide. In this case, in the context of an active adjustment, the covering cap 350 is adjusted prior to final fixing with respect to the wall sleeve 340. Such a construction is known for example from WO 98/10319 A1.

A transmission micromodule 370 and a reception micromodule 380 are arranged on the baseplate 310 of the TO housing. The transmission micromodule 370 has, as essential components, an edge emitting semiconductor laser 371, a 45° prism 372 with a monitor diode 373, a beam splitter 374 with a beam-splitting area 375 provided with a wavelength-selective filter, and a silicon carrier 376 with an integrated lens 377. These components are arranged on a carrier 378. The reception micromodule 380 has a photodiode 382 on a carrier 381.

A depression 311 is formed in the baseplate 310 of the TO housing, the transmission micromodule 380 being inserted into said depression. The transmission micromodule 370 is arranged thereabove on the surface of the baseplate 310. In this case, the carrier element 378 of the transmission micromodule is transparent to the wavelength detected by the photodiode 382. Light emitted by the semiconductor laser 371 is reflected at the beam-splitting area 375 and radiated via the lens 377. By contrast, received light having a different wavelength passes through the wavelength-selective filter of the beam-splitting area 375, traverses the carrier element 387 and is detected by the photodiode 382 of the reception micromodule 380. The transmission micromodule 370 and the reception micromodule 380 are in each case contact-connected via the contact pins 320 and bonding wires (not illustrated).

The construction described likewise provides, in a very compact manner, a subassembly with a transmission and reception arrangement by means of which, simultaneously, light having a first wavelength can be emitted and light having a second wavelength can be detected.

The TO housing used preferably has external dimensions perpendicular to the optical axis of the emerging laser light of at most 6.5 mm, thereby enabling mounting in Small Form Factor (SFF) transceivers and Small Form Factor Pluggable (SFP transceivers) of small design.

The configuration of the invention is not restricted to the exemplary embodiments presented above, which are to be understood merely by way of example. The person skilled in the art recognizes that numerous alternative embodiment variants exist which, despite their deviation from the exemplary embodiments described, make use of the teaching defined in the claims hereinafter.

The invention claimed is:

1. An optoelectronic transceiver for a bidirectional optical signal transmission, the optoelectronic transceiver comprising:
   a housing having a width of at most 13.5 mm;
   a first bidirectional optical subassembly arranged in the housing and serving for the simultaneous emission and reception of optical signals;
   a second bidirectional optical subassembly arranged in the housing and serving for the simultaneous emission and reception of optical signals; and
   an optical interface for coupling two optical waveguides, such that each optical waveguide is optically coupled to a corresponding one of the first and second bidirectional optical subassemblies,
   wherein the first subassembly comprises:
      a transmission component for emitting light having a first wavelength; and
      a reception component for detecting light having a second wavelength,
      wherein at least a portion of one of the transmission and reception components is optically transparent to the light emitted or detected by the other of the transmission and reception components.

2. The transceiver as claimed in claim 1, further comprising a multiplexer and a demultiplexer,
   wherein the demultiplexer includes means for dividing an electrical data stream having a first predetermined bandwidth, which is to be transmitted by the transceiver, into a first and a second electrical partial data stream each having a smaller bandwidth than the first predetermined bandwidth,
   wherein the first electrical partial datastream to be transmitted is fed to the first subassembly and the second electrical partial datastream to be transmitted is fed to the second subassembly such that the electrical partial datastreams are emitted simultaneously as optical signals,
   and
   wherein the first subassembly and the second subassembly are configured to receive a first optical partial datastream and a second optical partial datastream, respectively, convert the respective optical partial datastreams into electrical signals, and feed the respective optical partial datastreams to the multiplexer, which includes means for combining the two received partial datastreams into a received electrical datastream having a second predetermined bandwidth higher than a bandwidth of either of the first and second optical partial datastreams.

3. The transceiver as claimed in claim 2, wherein the demultiplexer comprises a 1:2 demultiplexer and the multiplexer comprises a 2:1 multiplexer, and wherein the first and second predetermined bandwidths are identical.

4. The transceiver as claimed in claim 1, wherein the multiplexer and the demultiplexer are integrated into the transceiver.

5. The transceiver as claimed in claim 1, wherein the first subassembly further comprises:
   a carrier substrate, which is transparent to the light having the first wavelength and on which the transmission component is arranged; and
   a monitor component for detecting a fraction of the light emitted by the transmission component,
   wherein the reception component is integrated into the carrier substrate,
   wherein the reception component and the transmission component are arranged one behind the other with respect to the direction of the emitted or received light,
   wherein the reception component is optically transparent to the light having the first wavelength, and
   wherein light emitted by the transmission component radiates through the carrier substrate and the reception component.

6. The transceiver as claimed in claim 5, wherein the transmission component is mounted with its top side downward on the carrier substrate.

7. The transceiver as claimed in claim 5, wherein the reception component is integrated into the carrier substrate on a side of the carrier substrate which is remote from the transmission component.

8. The transceiver as claimed in claim 7, wherein the carrier substrate has two plated-through holes, which issue from the side of the carrier substrate facing the transmission component and contact-connect the reception component.

9. The transceiver as claimed in claim 5, wherein the reception component integrated into the carrier substrate forms a pn junction integrated into the carrier substrate.

10. The transceiver as claimed in claim 5, wherein the carrier substrate is not transparent to light having the second wavelength.

11. The transceiver as claimed in claim 5, wherein the first wavelength is greater than the second wavelength.

12. The transceiver as claimed in claim 11, wherein the first wavelength is one of 1310 nm, 1490 nm and 1550 nm, and the second wavelength is one of 850 nm and 1310 nm.

13. The transceiver as claimed in claim 5, wherein the carrier substrate comprises silicon.

14. The transceiver as claimed in claim 5, wherein the monitor component is arranged on that side of the transmission component which is remote from the carrier substrate.

15. The transceiver as claimed in claim 5, wherein the transmission component comprises a laser chip and the monitor component comprises a monitor diode chip.

16. The transceiver as claimed in claim 5, wherein the monitor component is integrated into the transmission component on that side of the latter which is remote from the carrier substrate.

17. The transceiver as claimed in claim 1, wherein the second subassembly comprises:
   a transmission component for emitting light having the second wavelength;
   a reception component for detecting light having the first wavelength;

a carrier substrate, which is transparent to the light having either of the first wavelength and the second wavelength and on which the transmission component is arranged; and a monitor component for detecting a fraction of the light emitted by the transmission component, wherein the reception component and the transmission component are arranged one behind the other with respect to the direction of the emitted or received light, wherein the transmission component is optically transparent to the light having the first wavelength, wherein light emitted by the transmission component radiates through the carrier substrate, and wherein the light received by the reception component radiates through the carrier substrate and the transmission components.

18. The transceiver as claimed in claim 17, wherein the monitor component is integrated into the carrier substrate.

19. The transceiver as claimed in claim 18, wherein the monitor component is integrated into the carrier substrate on a side of the latter which faces the transmission component.

20. The transceiver as claimed in claim 18, wherein the monitor component integrated into the carrier substrate forms a pn junction integrated into the carrier substrate.

21. The transceiver as claimed in claim 17, wherein the monitor component is integrated into the transmission component.

22. The transceiver as claimed in claim 17, wherein the transmission component is arranged with its top side downward on the carrier substrate.

23. The transceiver as claimed in claim 17, wherein the photosensitive layer of the reception component is arranged on that side of the reception component which is remote from the transmission component.

24. The transceiver as claimed in claim 17, wherein the substrate of the transmission component is not transparent to the emitted light having the second wavelength.

25. The transceiver as claimed in claim 17, wherein the first wavelength is greater than the second wavelength.

26. The transceiver as claimed in claim 25, wherein the first wavelength is one of 1310 nm, 1490 nm and 1550 nm, and the second wavelength is one of 850 nm and 1310 nm.

27. The transceiver as claimed in claim 17, wherein the carrier substrate comprises sapphire.

28. The transceiver as claimed in claim 17, wherein the transmission component comprises a laser chip and the reception component comprises a photodiode chip.

29. The transceiver as claimed in claim 17, wherein the transmission component comprises a vertically emitting laser diode.

30. The transceiver as claimed in claim 1, wherein each subassembly further comprises:

a TO housing having a baseplate, which serves for the arrangement of the transmission component and of the reception component, wherein the transmission component and the reception component are arranged one above the other with respect to one of the emitted light and the light to be detected, and wherein the transmission component includes a laser component on a first carrier element and wherein the first carrier element is transparent to the light to be detected.

31. The transceiver as claimed in claim 30, wherein the baseplate of the TO housing includes a cutout, which serves to accommodate the reception component, the transmission component being arranged thereabove on the baseplate.

32. An optoelectronic transceiver for a bidirectional optical signal transmission, the optoelectronic transceiver comprising:

a first bidirectional optical subassembly including a first emitting component for emitting light having a first wavelength and a first receiving component for receiving light having a second wavelength;

a second bidirectional optical subassembly including a second emitting component for emitting light having the second wavelength and a second receiving component for receiving light having the first wavelength;

means for separating a transmission signal into first and second signal components; and means for simultaneously driving the first and second emitting components such that the first emitting component generates a first light signal in accordance with the first signal component, and the second emitting component generates a second light signal in accordance with the second signal component, wherein at least a portion of one of the first emitting and the first receiving components is optically transparent to the light emitted or detected by the other of the first emitting and the first receiving components, and wherein at least a portion of one of the second emitting and the second receiving components is optically transparent to the light emitted or detected by the other of the second emitting and the second receiving components.

33. The optoelectronic transceiver according to claim 32, wherein said means for separating comprises a demultiplexer having an input terminal coupled to receive the transmission signal, and a pair of output terminals respectively coupled to the first and second emitting components.

34. The optoelectronic transceiver according to claim 32, further comprising means for generating a reception signal by combining a first reception signal component and a second reception signal component that are simultaneously generated by the first receiving component and the second receiving component, respectively, in response to a third light signal applied to the first receiving component and a fourth light signal applied to the second receiving component, respectively.

35. The optoelectronic transceiver according to claim 34, wherein said means for generating comprises a multiplexer having a first input terminal coupled to receive the first reception signal component from the first receiving component, and a second input terminal coupled to receive the second reception signal component from the second receiving component.

36. An optoelectronic transceiver for a bidirectional optical signal transmission, the optoelectronic transceiver comprising:

a first bidirectional optical subassembly including a first emitting component for emitting light having a first wavelength and a first receiving component for receiving light having a second wavelength;

a second bidirectional optical subassembly including a second emitting component for emitting light having the second wavelength and a second receiving component for receiving light having the first wavelength; and means for generating a reception signal by combining a first reception signal component and a second reception signal component that are simultaneously generated by the first receiving component and the second receiving component, respectively, in response to a third light signal applied to the first receiving component and a fourth light signal applied to the second receiving component, respectively, wherein at least a portion of one of the first emitting and the first receiving components is optically transparent to the light emitted or detected by the other of the first emitting and the first receiving components, and wherein at least a portion of one of the second emitting and the second receiving components is optically transparent to the light emitted or detected by the other of the second emitting and the second receiving components.

37. The optoelectronic transceiver according to claim 36, wherein said means for generating comprises a multiplexer having a first input terminal coupled to receive the first reception signal component from the first receiving component, and a second input terminal coupled to receive the second reception signal component from the second receiving component.

* * * * *

UNITED STATES PATENT AND TRADEMARK OFFICE
CERTIFICATE OF CORRECTION

PATENT NO.         : 7,418,208 B2
APPLICATION NO.    : 10/769287
DATED              : August 26, 2008
INVENTOR(S)        : Weigert It is certified that error appears in the above-identified patent and that said Letters Patent is hereby corrected as shown below:

Column 4
Line 2, change "preferable" to --preferably--
Line 64, change "detail" to --detailed--

Column 5
Line 34, change "13.5m" to --13.5mm--

Column 11
Line 10, change "(SFP transceivers)" to --(SFP) transceivers--

Signed and Sealed this

Thirtieth Day of November, 2010

David J. Kappos
*Director of the United States Patent and Trademark Office*